(12) United States Patent
Aso et al.

(10) Patent No.: US 9,353,978 B2
(45) Date of Patent: May 31, 2016

(54) ADSORBER AND ADSORPTION HEAT PUMP

(71) Applicant: FUJITSU LIMITED, Kawasaki-shi, Kanagawa (JP)

(72) Inventors: Noriyasu Aso, Isehara (JP); Toshio Manabe, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 441 days.

(21) Appl. No.: 13/926,137

(22) Filed: Jun. 25, 2013

(65) Prior Publication Data

US 2013/0276475 A1 Oct. 24, 2013

Related U.S. Application Data

(63) Continuation of application No. PCT/JP2011/000344, filed on Jan. 24, 2011.

(51) Int. Cl.
*F25B 17/00* (2006.01)
*F25B 17/08* (2006.01)
*F25B 30/04* (2006.01)

(52) U.S. Cl.
CPC ............... *F25B 17/00* (2013.01); *F25B 17/083* (2013.01); *F25B 30/04* (2013.01); *Y02B 30/64* (2013.01)

(58) Field of Classification Search
CPC ........ F25B 17/00; F25B 17/083; F25B 30/04; Y02B 30/64
USPC ............... 62/477, 476, 478, 480; 96/131, 149
See application file for complete search history.

(56) References Cited

U.S. PATENT DOCUMENTS

| | | | | | |
|---|---|---|---|---|---|
| 4,285,208 A | * | 8/1981 | Takeshita | ................ | F25B 25/02 62/141 |
| 5,025,635 A | * | 6/1991 | Rockenfeller | ........ | F25B 17/083 62/106 |
| 5,477,705 A | * | 12/1995 | Meunier | ................. | F25B 17/08 165/104.12 |
| 5,619,866 A | * | 4/1997 | Sato | ...................... | F25B 17/083 62/106 |
| 6,041,617 A | * | 3/2000 | Sanada | ................. | F25B 17/083 165/104.12 |
| 6,086,659 A | * | 7/2000 | Tentarelli | .......... | B01D 53/0431 422/179 |
| 6,155,073 A | * | 12/2000 | Gray | ..................... | F25B 17/083 62/480 |
| 6,158,237 A | * | 12/2000 | Riffat | ..................... | B01D 3/007 165/92 |
| 6,595,022 B2 | * | 7/2003 | Pokharna | .............. | F25B 17/083 361/688 |

(Continued)

FOREIGN PATENT DOCUMENTS

| | | |
|---|---|---|
| JP | H5-504612 | 7/1993 |
| JP | H11-223411 | 8/1999 |

(Continued)

OTHER PUBLICATIONS

International Search Report for International Application No. PCT/JP2011/000344 dated Feb. 22, 2011.

(Continued)

*Primary Examiner* — Mohammad M Ali
(74) *Attorney, Agent, or Firm* — Kratz, Quintos & Hanson, LLP

(57) ABSTRACT

An adsorber includes: two or more adsorbents with different coolant vapor-pressure conditions and different coolant temperature conditions corresponding to a lower limit value for a coolant adsorption amount and an upper limit value for the coolant adsorption amount; a container that contains at least one of the adsorbents and in which a coolant is sealable; and a channel pipe that extends through the container, is thermally in contact with the two or more adsorbents, and functions as a channel.

8 Claims, 8 Drawing Sheets

(56) References Cited

U.S. PATENT DOCUMENTS

| | | | |
|---|---|---|---|
| 2003/0000231 A1* | 1/2003 | Pokharna | F25B 17/083 62/101 |
| 2003/0005721 A1* | 1/2003 | Sato | B60H 1/3201 62/480 |
| 2006/0130652 A1* | 6/2006 | Takewaki | B01D 53/28 95/148 |
| 2008/0229766 A1* | 9/2008 | Sharma | F24F 5/0014 62/101 |
| 2009/0095012 A1* | 4/2009 | Akisawa | F25B 17/08 62/476 |
| 2010/0044012 A1* | 2/2010 | Sharma | F24F 5/0014 165/104.19 |

FOREIGN PATENT DOCUMENTS

| | | |
|---|---|---|
| JP | 2005-205331 A1 | 8/2005 |
| JP | 2009-180405 A1 | 8/2009 |
| JP | 2010-175108 A | 8/2010 |

OTHER PUBLICATIONS

Japanese Office Action dated Sep. 24, 2014 in the corresponding Japanese patent application No. 2012-554474, with English translation.

Notification of Reasons for Refusal issued May 7, 2014 in counterpart application No. 2010-554474 with English translation.

* cited by examiner

DESORBING

ADSORBING

FIG. 6

|  | EMBODIMENT | COMPARATIVE EXAMPLE |
|---|---|---|
| COOLING WATER (CONDENSER) | 25°C | 25°C |
| COOLING WATER (ADSORBER) | 25°C → 30°C | 25°C → 28°C |
| COLD WATER/ COLD-ENERGY WATER (EVAPORATOR) | 18°C → 12°C | 18°C → 15°C |
| HOT DISCHARGE WATER (ADSORBER) | 55°C → 48°C | 55°C → 51°C |
| ADSORBENT | SILICA GEL/ ACTIVATED CARBON | SILICA GEL |

ADSORBING

DESORBING

ADSORBER AND ADSORPTION HEAT PUMP

CROSS-REFERENCE TO RELATED APPLICATION

This application is based upon and claims the benefit of priority of the prior WO International Application PCT/JP2011/000344, filed on Jan. 24, 2011, the entire contents of which are incorporated herein by reference.

FIELD

The embodiments discussed herein are related to adsorbers and adsorption heat pumps.

BACKGROUND

A typical adsorption heat pump includes an adsorber that adsorbs and desorbs a coolant, such as water, by using an adsorbent, an evaporator that generates cooling energy by evaporating the coolant as the adsorber performs an adsorbing operation, and a condenser that condenses the vapor of the coolant desorbed and adsorbed at the adsorber and supplies the condensed coolant to the evaporator. The adsorber, the evaporator, and the condenser are arranged in series along a coolant circulation pipe.

Examples of hot water used in the adsorber when desorbing the coolant from the adsorbent include vehicle-engine cooling water at 85° C. to 90° C., hot discharge water at 60° C. to 80° C. from a high-molecular fuel cell, and hot discharge water at 60° C. to 80° C. from a cogeneration device.

On the other hand, examples of cooling water used in the adsorber when adsorbing the coolant to the adsorbent include cooling water at 30° C. to 40° C. used in a radiator of a vehicle and cooling water or river water at 25° C. to 35° C. used in a building.

Thus, by selecting an adsorbent with high coolant adsorption characteristics within a temperature range and at a vapor pressure within the adsorber, which are related to the operation of the adsorption heat pump, it is expected that the performance of the adsorption heat pump can be improved.

Japanese Laid-open Patent Publication No. 2005-205331 discusses an adsorption heat pump containing an adsorbent that exhibits high coolant adsorption efficiency even when there is a small temperature difference between the hot water and the cooling water used in the adsorber.

Japanese Laid-open Patent Publication No. 2009-180405 discusses an adsorption heat pump equipped with a plurality of adsorbers that are arranged in parallel along a coolant circulation pipe. The adsorbers contain adsorbents with which the adsorbers perform coolant desorption effectively in different temperature ranges and different vapor pressure ranges. This adsorption heat pump has a function of selecting one of the adsorbers in accordance with an operational temperature range of the adsorption heat pump.

In each adsorber of the adsorption heat pump, the temperature of the hot water or cooling water flowing through a pipe extending through the adsorber varies between near the inlet of the pipe and near the outlet of the pipe. This is because the hot water is gradually cooled and the cooling water is gradually heated by the adsorbent.

This sometimes makes it difficult to maintain high adsorption characteristics in a part of the adsorbent in the adsorber. In that case, it is assumed that there is a difficulty in achieving the original coolant adsorption efficiency of the adsorber in accordance with the adsorbent.

SUMMARY

According to an aspect of the invention, an adsorber includes: two or more adsorbents with different coolant vapor-pressure conditions and different coolant temperature conditions corresponding to a lower limit value for a coolant adsorption amount and an upper limit value for the coolant adsorption amount; a container that contains at least one of the adsorbents and in which a coolant is sealable; and a channel pipe that extends through the container, is thermally in contact with the two or more adsorbents, and functions as a channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table illustrating comparison results between a specific example of the adsorption heat pump according to the first embodiment and a comparative example, the results corresponding to temperature changes in the cooling water and the hot discharge water passing through the adsorbers;

DESCRIPTION OF EMBODIMENTS

The following embodiments may include design alterations conceivable by a skilled person as well as recombination of elements, conceivable by a skilled person, described in the embodiments. The embodiments are not to be limited to the following and may include, for example, a configuration in which the elements are replaced by other elements that exhibit similar functions and advantages.

First Embodiment

Figure 1:
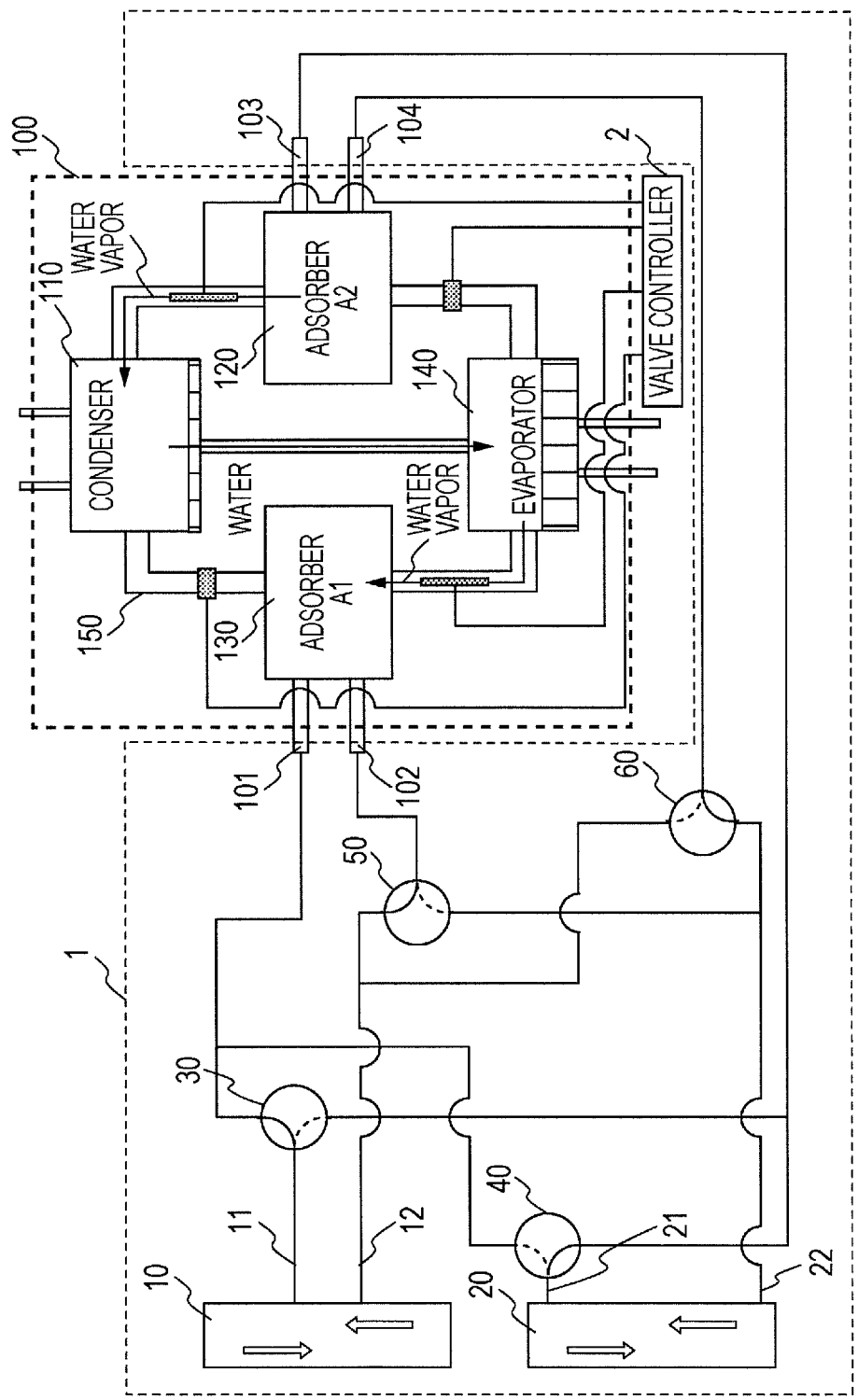
FIG. 1 illustrates an adsorption heat pump and a fluid supply mechanism attached to the adsorption heat pump.

FIG. 1 illustrates an adsorption heat pump 100 and a fluid supply mechanism 1 attached to the adsorption heat pump 100. The adsorption heat pump 100 includes a condenser 110, an adsorber A2 (120), an adsorber A1 (130), an evaporator 140, and coolant circulation pipes 150. The fluid supply mechanism 1 and a valve controller 2 are attached to the adsorption heat pump 100 and are configured to control a heat pump operation of the adsorption heat pump 100. The aforementioned elements included in the adsorption heat pump 100 will be described below with reference to FIG. 2.

A fluid supply mechanism 1 illustrated in FIG. 1 includes pumps 10 and 20, pipe switches 30, 40, 50, and 60, and fluid pipes. A fluid flowing through the fluid pipes is driven by the pumps 10 and 20. The flowing direction of the fluid is also changed by the pumps 10 and 20.

An inlet of the pipe switch 30 is connected to a pump port 11, and an upper outlet and a lower outlet of the pipe switch 30 are respectively connected to ports 101 and 103 of the adsorption heat pump 100.

An inlet of the pipe switch 40 is connected to a pump port 21, and an upper outlet and a lower outlet of the pipe switch 40 are respectively connected to the ports 101 and 103 of the adsorption heat pump 100.

An inlet of the pipe switch 50 is connected to a port 102 of the adsorption heat pump 100, and an upper outlet and a lower outlet of the pipe switch 50 are respectively connected to a port 12 of the pump 10 and a port 22 of the pump 20.

An inlet of the pipe switch 60 is connected to a port 104 of the adsorption heat pump 100, and an upper outlet and a lower outlet of the pipe switch 60 are respectively connected to the port 12 of the pump 10 and the port 22 of the pump 20.

A valve controller 2 is configured to control opening and closing of four on-off valves disposed in coolant circulation pipes 150. During period A, the valve controller 2 controls the on-off valves so as to open the coolant circulation pipe 150 between the condenser 110 and the adsorber A2 (120), close the coolant circulation pipe 150 between the evaporator 140 and the adsorber A2 (120), close the coolant circulation pipe 150 between the condenser 110 and the adsorber A1 (130), and open the coolant circulation pipe 150 between the evaporator 140 and the adsorber A1 (130).

During period B, the valve controller 2 controls the on-off valves so as to close the coolant circulation pipe 150 between the condenser 110 and the adsorber A2 (120), open the coolant circulation pipe 150 between the evaporator 140 and the adsorber A2 (120), open the coolant circulation pipe 150 between the condenser 110 and the adsorber A1 (130), and close the coolant circulation pipe 150 between the evaporator 140 and the adsorber A1 (130).

The pump 10 is configured to discharge hot discharge water toward the adsorption heat pump 100 and take in the hot discharge water that has been cooled by the adsorption heat pump 100. The pump 10 has a function of switching between two modes, that is, a mode in which the port 11 and the port 12 respectively serve as a discharge port and an intake port for the hot discharge water and a mode in which the port 12 and the port 11 respectively serve as a discharge port and an intake port for the hot discharge water.

The pump 20 is configured to discharge cooling water toward the adsorption heat pump 100 and take in the cooling water that has been cooled by the adsorption heat pump 100. The pump 20 has a function of switching between two modes, that is, a mode in which the port 21 and the port 22 respectively serve as a discharge port and an intake port for the cooling water and a mode in which the port 22 and the port 21 respectively serve as a discharge port and an intake port for the cooling water.

Accordingly, the fluid pipes and the pumps 10 and 20 have a function of allowing the adsorption heat pump 100 to alternately have periods A and B to be described below.

In period A, the hot discharge water flows into the port 103 and is discharged from the port 104 of the adsorption heat pump 100, and the cooling water flows into the port 102 and is discharged from the port 101. The hot discharge water flows from the port 103 toward the port 104, whereas the cooling water flows from the port 102 toward the port 101. The reason for setting the flowing directions of the hot discharge water and the cooling water in the above-described manner will be described with reference to FIG. 3A.

In period B, the hot discharge water flows into the port 101 and is discharged from the port 102 of the adsorption heat pump 100, and the cooling water flows into the port 104 and is discharged from the port 103. The hot discharge water flows from the port 101 toward the port 102, whereas the cooling water flows from the port 104 toward the port 103. The reason for setting the flowing directions of the hot discharge water and the cooling water in the above-described manner will be described with reference to FIG. 3B.

In the above description, the flowing directions of the hot discharge water and the cooling water are reversed by the pumps 10 and 20. Alternatively, the flowing directions of the hot discharge water and the cooling water may be changed by changing the directions of the adsorbers 120 and 130 in the adsorption heat pump 100.

Figure 2:
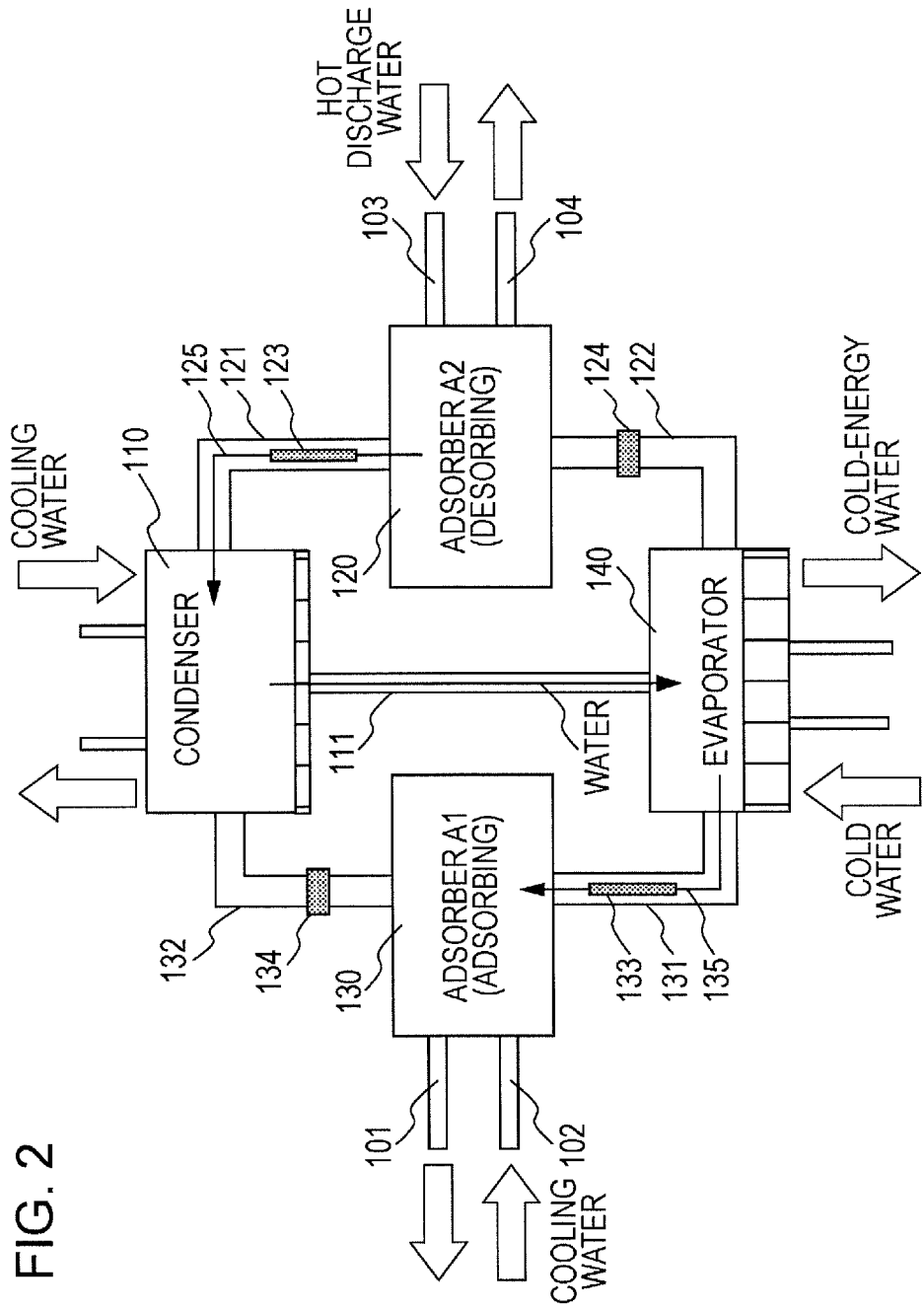
FIG. 2 illustrates an operational state of the adsorption heat pump during period A.

FIG. 2 illustrates an operational state of the adsorption heat pump 100 during period A. The adsorption heat pump 100 includes the condenser 110, the adsorber A2 (120), the adsorber A1 (130), the evaporator 140, coolant circulation pipes 121, 122, 131, and 132, and on-off valves 123, 124, 133, and 134.

The cooling water flows into the condenser 110 and flows out from the condenser 110. The direction in which the cooling water flows into and out from the condenser 110 is the same regardless of period A or B.

Cold water flows into the evaporator 140 where the cold water is cooled, and flows out from the evaporator 140. The direction in which the cold water flows into and out from the evaporator 140 is the same regardless of period A or B.

The adsorber A2 (120) includes a sealed container and a through-channel that extends through the sealed container and that is connected to the port 103 and the port 104. The adsorber A2 (120) contains two or more kinds of adsorbents with different coolant vapor-pressure conditions and different coolant temperature conditions corresponding to a lower limit value for a coolant adsorption amount and an upper limit value for the coolant adsorption amount. These adsorbents are in contact with the through-channel and are arranged in series along the through-channel from the port 103 toward the port 104.

Figure 5:
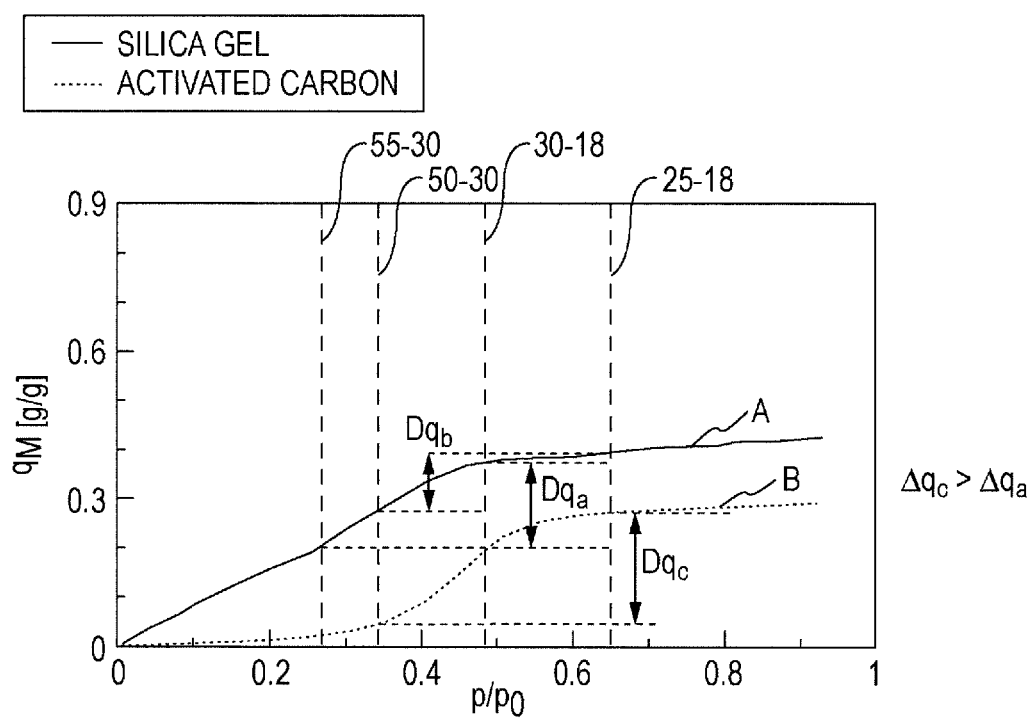
FIG. 5 is a graph illustrating coolant-adsorption isothermal lines of adsorbents contained in the first adsorber and the second adsorber.

It is assumed that relative vapor pressure conditions corresponding to the coolant adsorption amount, to be described with reference to FIG. 5, are set in correspondence with the coolant vapor-pressure conditions and the coolant temperature conditions corresponding to the lower limit value for the coolant adsorption amount and the upper limit value for the coolant adsorption amount. Thus, the aforementioned adsorbents would each have properties in which the adsorption amount changes within a range defined by a relative vapor pressure corresponding to the lower limit value for the coolant adsorption amount and a relative vapor pressure corresponding to the upper limit value for the coolant adsorption amount.

A first adsorbent having properties in which the adsorption amount thereof changes within a low relative vapor pressure range is disposed at the port 103 side, whereas a second adsorbent whose adsorption amount changes within a relative vapor pressure range that is higher than that of the first adsorbent is disposed at the port 104 side. In the case where multiple kinds of adsorbents are arranged, an adsorbent whose adsorption amount changes within a low relative vapor pressure range is disposed toward the port 103 side, and an adsorbent whose adsorption amount changes within a high relative vapor pressure range is disposed toward the port 104 side.

During period A, the hot discharge water flows into and out from the through-channel in the adsorber A2 (120) respectively via the port 103 and the port 104 of the adsorption heat pump 100. During period A, the adsorber A2 (120) receives the hot discharge water and desorbs water vapor, which is a coolant. As a result, the temperature of the hot discharge water at the port 103 gradually decreases as it flows toward the port 104.

During period A, the adsorber A2 (120) and the condenser 110 are connected to each other via the coolant circulation pipe 121, and the on-off valve 123 is in an open state. On the other hand, the on-off valve 124 in the coolant circulation pipe 122 that connects the adsorber A2 (120) and the evaporator 140 is in a closed state. In other words, the adsorber A2 (120), the condenser 110, and the coolant circulation pipe 121 form a closed space.

In the aforementioned closed space, water vapor 125 desorbed at the adsorber A2 (120) moves toward the condenser 110 where the water vapor 125 changes its phase to water. At the beginning of period A, the water vapor 125 desorbed owing to the hot discharge water flowing into the adsorber A2 (120) causes the vapor pressure within the aforementioned closed space to become equal to a saturated water vapor pressure with respect to the temperature within the adsorber A2 (120). Subsequently, when the water vapor 125 is no longer supplied from the adsorber A2 (120), the water vapor 125 in the condenser 110 changes to water so that the air pressure within the closed space becomes an air pressure corresponding to a liquid-phase-vapor-phase equilibrium state set in accordance with the temperature of the condenser 110.

The adsorber A1 (130) includes a sealed container and a through-channel that extends through the sealed container and that is connected to the port 101 and the port 102. The adsorber A1 (130) contains two or more kinds of adsorbents with different coolant vapor-pressure conditions and different coolant temperature conditions corresponding to a lower limit value for a coolant adsorption amount and an upper limit value for the coolant adsorption amount. These adsorbents are in contact with the through-channel and are arranged in series along the through-channel from the port 101 toward the port 102.

It is assumed that relative vapor pressure conditions corresponding to the coolant adsorption amount, to be described with reference to FIG. 5, are set in correspondence with the coolant vapor-pressure conditions and the coolant temperature conditions corresponding to the lower limit value for the coolant adsorption amount and the upper limit value for the coolant adsorption amount. Thus, the aforementioned adsorbents would each have properties in which the adsorption amount changes within a range defined by a relative vapor pressure corresponding to the lower limit value for the coolant adsorption amount and a relative vapor pressure corresponding to the upper limit value for the coolant adsorption amount.

A first adsorbent having properties in which the adsorption amount thereof changes within a low relative vapor pressure range is disposed at the port 101 side, whereas a second adsorbent whose adsorption amount changes within a relative vapor pressure range that is higher than that of the first adsorbent is disposed at the port 102 side. In the case where multiple kinds of adsorbents are arranged, an adsorbent whose adsorption amount changes within a high relative vapor pressure range is disposed toward the port 102 side, and an adsorbent whose adsorption amount changes within a low relative vapor pressure range is disposed toward the port 101 side.

During period A, the cooling water flows into and out from the through-channel in the adsorber A1 (130) respectively via the port 102 and the port 101 of the adsorption heat pump 100. During period A, the adsorber A1 (130) receives the cooling water and adsorbs water vapor, which is a coolant. As a result, the temperature of the cooling water at the port 102 gradually increases as it flows toward the port 101.

During period A, the adsorber A1 (130) and the evaporator 140 are connected to each other via the coolant circulation pipe 131, and the on-off valve 133 is in an open state. On the other hand, the on-off valve 134 in the coolant circulation pipe 132 that connects the adsorber A1 (130) and the condenser 110 is in a closed state. In other words, the adsorber A1 (130), the evaporator 140, and the coolant circulation pipe 131 form a closed space.

In the aforementioned closed space, water vapor 135 to be adsorbed at the adsorber A1 (130) has been changed in phase from water to water vapor in the evaporator 140. At the beginning of period A, the cooling water flowing into the adsorber A1 (130) causes the water vapor 135 to be adsorbed therein so that the vapor pressure within the aforementioned closed space decreases from a saturated water vapor pressure with respect to the temperature within the adsorber A1 (130). Subsequently, when the water vapor 135 is no longer adsorbed in the adsorber A1 (130), water changes to water vapor in the evaporator 140 so that the air pressure within the closed space becomes an air pressure corresponding to a liquid-phase-vapor-phase equilibrium state set in accordance with the temperature of the evaporator 140. During period A, water is supplied from the condenser 110 to the evaporator 140 via a pipe 111.

During period B, the hot discharge water flows through the adsorber A1 (130) from the port 101 toward the port 102. Furthermore, the adsorber A1 (130) forms a closed space together with the condenser 110 and the coolant circulation pipe 132. In this case, the on-off valve 134 is in an open state and the on-off valve 133 is in a closed state. The vapor pressure within the closed space formed by the adsorber A1 (130), the condenser 110, and the coolant circulation pipe 132 during period B changes similarly to the vapor pressure within the closed space formed by the adsorber A2 (120), the condenser 110, and the coolant circulation pipe 121 during period A.

On the other hand, during period B, the cooling water flows through the adsorber A2 (120) from the port 104 toward the port 103. Furthermore, the adsorber A2 (120) forms a closed space together with the evaporator 140 and the coolant circulation pipe 122. In this case, the on-off valve 124 is in an open state and the on-off valve 123 is in a closed state. The vapor pressure within the closed space formed by the adsorber A2 (120), the evaporator 140, and the coolant circulation pipe 122 during period B changes similarly to the vapor pressure within the closed space formed by the adsorber A1 (130), the evaporator 140, and the coolant circulation pipe 131 during period A.

Figure 3A:
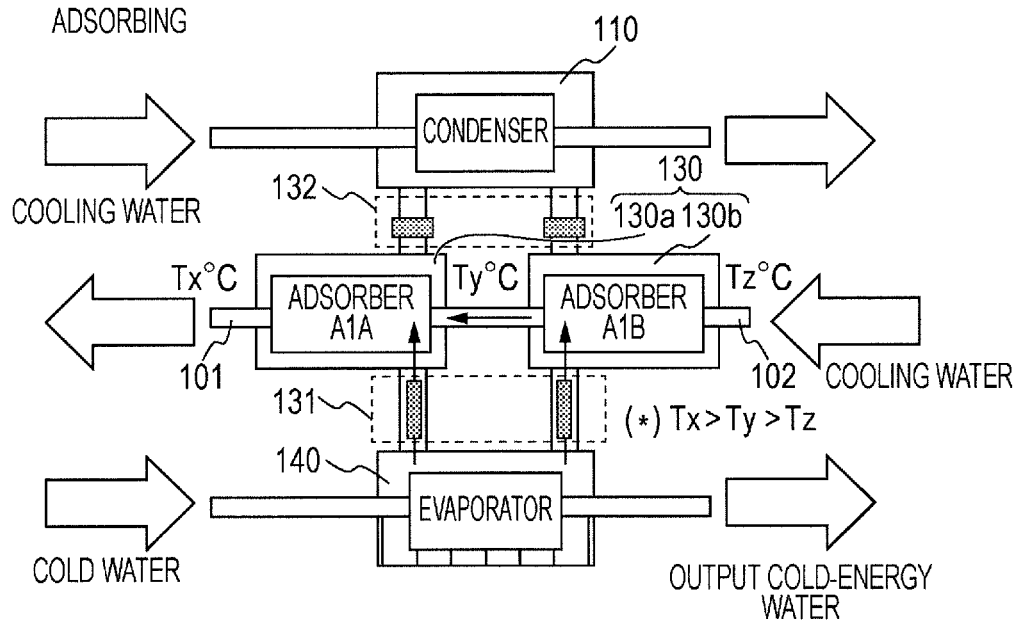
FIG. 3A and FIG. 3B illustrate the configurations of a first adsorber and a second adsorber according to a first embodiment and the flowing directions of hot discharge water and cooling water during period A.
Figure 3B:
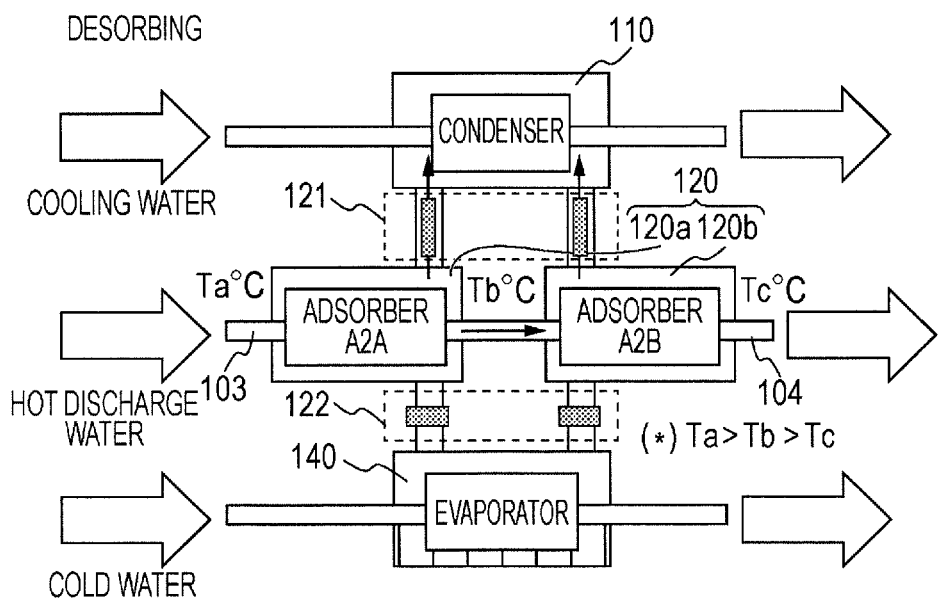

FIG. 3A and FIG. 3B illustrate the configurations of the adsorber A1 (130) and the adsorber A2 (120) according to a first embodiment and the flowing directions of the hot discharge water and the cooling water during period A.

In FIG. 3A, the condenser 110, the coolant circulation pipes 131 and 132, the evaporator 140, and the ports 101 and 102 are depicted. Since the condenser 110, the evaporator 140, and the ports 101 and 102 have functions that are the same as those described with reference to FIG. 2, descriptions thereof will be omitted.

The coolant circulation pipe 131 includes a pipe that connects an adsorber A1A (130a) and the evaporator 140, an on-off valve that is disposed in the pipe and that opens and closes the pipe, a pipe that connects an adsorber A1B (130b) and the evaporator 140, and an on-off valve that is disposed in the pipe and opens and closes the pipe.

The coolant circulation pipe 132 includes a pipe that connects the adsorber A1A (130a) and the condenser 110, an on-off valve that is disposed in the pipe and that opens and closes the pipe, a pipe that connects the adsorber A1B (130b) and the condenser 110, and an on-off valve that is disposed in the pipe and that opens and closes the pipe.

The adsorber A1 (130) in FIG. 3A includes the adsorber A1A (130a) and the adsorber A1B (130b).

The adsorber A1A (130a) includes a sealed container that is sealed by closing the on-off valves, a pipe extending through the container and allowing the cooling water or the hot discharge water to flow therethrough, and an adsorbent that is thermally in contact with the pipe and that adsorbs or desorbs a coolant within the container. The adsorber A1B (130b) includes components similar to those of the adsorber A1A (130a). The pipe in the adsorber A1A (130a) and the pipe in the adsorber A1B (130b) constitute one continuous pipe having the port 101 and the port 102. The adsorber A1A (130a) is disposed at the port 101 side of the pipe, whereas the adsorber A1B (130b) is disposed at the port 102 side of the pipe.

During period A discussed in FIG. 2, the cooling water is injected through the port 102 and is discharged from the port 101. Because the adsorbents are heated owing to moisture adsorption, the temperature of the cooling water increases as it flows from the port 102 toward the port 101. Specifically, the relationship Tx>Ty>Tz is satisfied, where Tz denotes the temperature of the cooling water at the port 102, Ty denotes the temperature of the cooling water between the adsorber A1B (130b) and the adsorber A1A (130a), and Tx denotes the temperature of the cooling water at the port 101.

The adsorber A1A (130a) has an adsorbent whose adsorption amount changes within a low relative vapor pressure range. The relative vapor pressure range in which the adsorption amount in the adsorber A1A (130a) changes ranges between, for example, 0 and 0.48. The adsorber A1B (130b) has an adsorbent whose adsorption amount changes within a high relative vapor pressure range. The relative vapor pressure range in which the adsorption amount in the adsorber A1B (130b) changes ranges between, for example, 0.37 and 0.58. The relative vapor pressure ranges in which the adsorption amounts in the adsorber A1A (130a) and the adsorber A1B (130b) change will be described in detail later with reference to FIG. 5.

In FIG. 3B, the condenser 110, the coolant circulation pipes 121 and 122, the evaporator 140, and the ports 103 and 104 are depicted. Since the condenser 110, the evaporator 140, and the ports 103 and 104 have functions that are the same as those described with reference to FIG. 2, descriptions thereof will be omitted.

The coolant circulation pipe 122 includes a pipe that connects an adsorber A2A (120a) and the evaporator 140, an on-off valve that is disposed in the pipe and that opens and closes the pipe, a pipe that connects an adsorber A2B (120b) and the evaporator 140, and an on-off valve that is disposed in the pipe and that opens and closes the pipe.

The coolant circulation pipe 121 includes a pipe that connects the adsorber A2A (120a) and the condenser 110, an on-off valve that is disposed in the pipe and that opens and closes the pipe, a pipe that connects the adsorber A2B (120b) and the condenser 110, and an on-off valve that is disposed in the pipe and that opens and closes the pipe.

The adsorber A2 (120) in FIG. 3B includes the adsorber A2A (120a) and the adsorber A2B (120b).

The adsorber A2A (120a) includes a sealed container that is sealed by closing the on-off valves, a pipe extending through the container and allows the cooling water or the hot discharge water to flow therethrough, and an adsorbent that is thermally in contact with the pipe and that adsorbs or desorbs a coolant within the container. The adsorber A2B (120b) includes elements similar to those of the adsorber A2A (120a). The pipe in the adsorber A2A (120a) and the pipe in the adsorber A2B (120b) constitute one continuous pipe having the port 103 and the port 104. The adsorber A2A (120a) is disposed at the port 103 side of the pipe, whereas the adsorber A2B (120b) is disposed at the port 104 side of the pipe.

During period A discussed in FIG. 2, the hot discharge water is injected through the port 103 and is discharged from the port 104. Because the adsorbents are cooled owing to moisture evaporation, the temperature of the hot discharge water decreases as it flows from the port 103 toward the port 104. Specifically, the relationship Ta>Tb>Tc is satisfied, where Ta denotes the temperature of the hot discharge water at the port 103, Tb denotes the temperature of the hot discharge water between the adsorber A2B (120b) and the adsorber A2A (120a), and Tc denotes the temperature of the hot discharge water at the port 104.

The adsorber A2A (120a) has an adsorbent whose adsorption amount changes within a low relative vapor pressure range. The relative vapor pressure range in which the adsorption amount in the adsorber A2A (120a) changes ranges between, for example, 0 and 0.48. The adsorber A2B (120b) has an adsorbent whose adsorption amount changes within a high relative vapor pressure range. The relative vapor pressure range in which the adsorption amount in the adsorber A2B (120b) changes ranges between, for example, 0.37 and 0.58. The relative vapor pressure ranges in which the adsorption amounts in the adsorber A2A (120a) and the adsorber A2B (120b) change will be described in detail later with reference to FIG. 5.

Figure 4A:
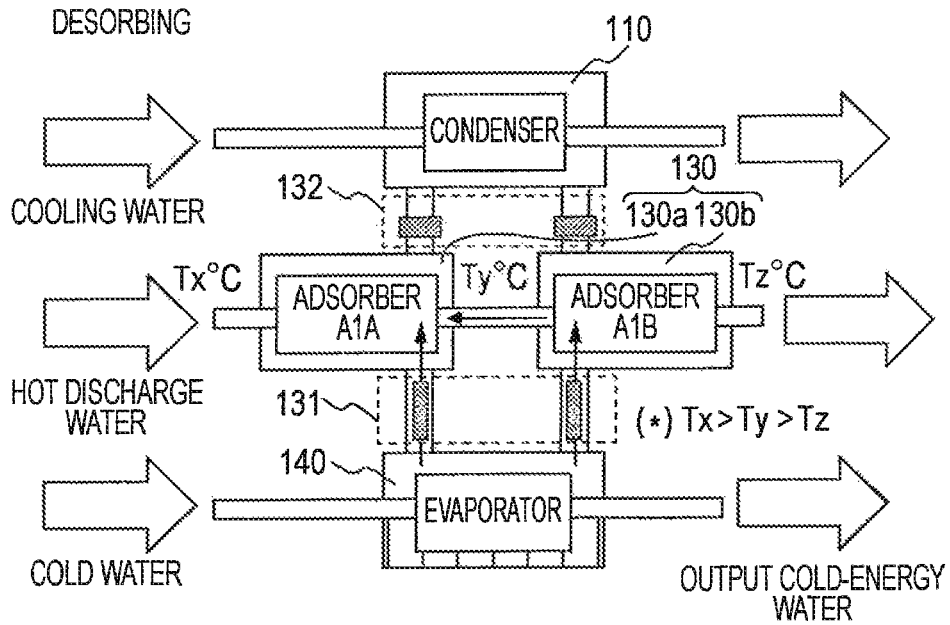
FIG. 4A and FIG. 4B illustrate the configurations of the first adsorber and the second adsorber according to the first embodiment and the flowing directions of hot discharge water and cooling water during period B.
Figure 4B:
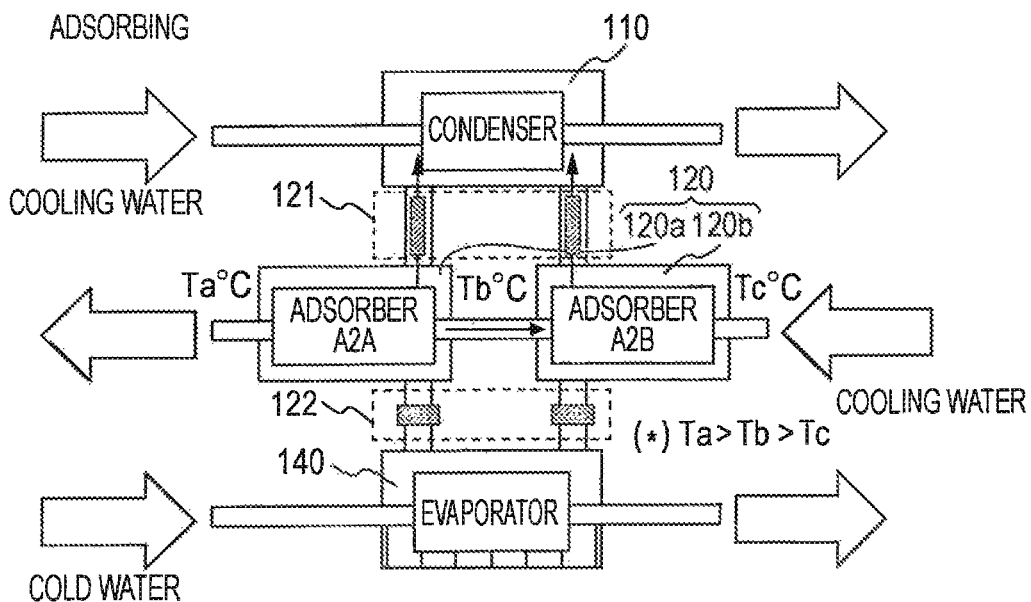

FIG. 4A and FIG. 4B illustrate the configurations of the adsorber A1 (130) and the adsorber A2 (120) according to the first embodiment and the flowing directions of the hot discharge water and the cooling water during period B. Because the configurations of the adsorber A1 (130) and the adsorber A2 (120) according to the first embodiment illustrated in FIG. 4A and FIG. 4B are the same as the configurations of the adsorber A1 (130) and the adsorber A2 (120) according to the first embodiment illustrated in FIG. 3A and FIG. 3B, descriptions thereof will be omitted.

Referring to FIG. 4A, during period B discussed in FIG. 2, the hot discharge water is injected into the adsorber A1 (130) according to the first embodiment through the port 101 and is discharged from the port 102. Because the adsorbents are cooled owing to moisture evaporation, the temperature of the hot discharge water decreases as it flows from the port 101 toward the port 102. Specifically, the relationship Tx>Ty>Tz is satisfied, where Tz denotes the temperature of the hot discharge water at the port 102, Ty denotes the temperature of the hot discharge water between the adsorber A1B (130b) and the adsorber A1A (130a), and Tx denotes the temperature of the hot discharge water at the port 101.

Referring to FIG. 4B, during period B discussed in FIG. 2, the cooling water is injected into the adsorber A2 (120) according to the first embodiment through the port 104 and is discharged from the port 103. Because the adsorbents are heated owing to moisture adsorption, the temperature of the cooling water increases as it flows from the port 104 toward the port 103. Specifically, the relationship Ta>Tb>Tc is satisfied, where Tc denotes the temperature of the cooling water at the port 104, Tb denotes the temperature of the cooling water between the adsorber A2B (120b) and the adsorber A2A (120a), and Ta denotes the temperature of the cooling water at the port 103.

FIG. 5 is a graph illustrating coolant-adsorption isothermal lines of the adsorbents contained in the adsorber A1 (130) and the adsorber A2 (120).

In the graph illustrated in FIG. 5, the horizontal axis denotes a relative vapor pressure, whereas the vertical axis denotes a moisture adsorption amount. The term "relative vapor pressure" used here refers to a ratio between an adsorption equilibrium pressure and a saturated vapor pressure. The term "adsorption equilibrium pressure" refers to an air pressure in a state where the progression of coolant adsorption has stopped, and is determined as follows based on the temperature within the condenser 110. Furthermore, the term "saturated vapor pressure" refers to a saturated vapor pressure of coolant corresponding to the temperature within each adsorber. Specifically, a relative vapor pressure is expressed as follows.

Relative Vapor Pressure=Adsorption Equilibrium Pressure/Saturated Vapor Pressure For example, in a case where the adsorber A2 (120) and the condenser 110 form a closed space, if the hot discharge water at 55° C. flows through the pipe extending through the adsorber A2 (120) and the cooling water at 30° C. flows through the condenser 110, a relative vapor pressure can be determined as follows. First, the condenser 110 is in a liquid-phase-vapor-phase equilibrium state, and the vapor pressure within the condenser 110 is about 42 hPa. On the other hand, with regard to the vapor pressure within the container of the adsorber A2 (120), when the hot discharge water starts to flow therethrough, moisture is supplied from the adsorbents so that the vapor pressure becomes a saturated water vapor pressure of about 157 hPa at 55° C. Subsequently, as moisture desorption progresses to some extent, the supply of moisture substantially ends, and the pressure within the container of the adsorber A2 (120) becomes substantially equal to the vapor pressure within the condenser 110, whereby an adsorption equilibrium state is realized. Therefore, in the graph in FIG. 5, a relative vapor pressure that corresponds to the aforementioned state is a numerical value corresponding to a point where a line expressed by (55-30) and an X-axis intersect, and is about 0.27 (=42 hPA/150 hPa).

A solid curve line A denotes an isothermal line with respect to an adsorbent whose adsorption amount changes within a low relative vapor pressure range. A solid curve line B denotes an isothermal line with respect to an adsorbent whose adsorption amount changes within a high relative vapor pressure range.

An isothermal line is a curve line denoting a moisture adsorption amount of an adsorbent relative to a relative vapor pressure. As described above, the relative vapor pressure is related to a difference between the temperature of an adsorbent in an adsorber and the temperature of the evaporator 140 or the condenser 110 connected to the container of the adsorber. Therefore, if the temperature of the evaporator 140 or the condenser 110 is fixed, the relative vapor pressure in the adsorber moves leftward (i.e., decreases in value) on the horizontal axis as the temperature of the adsorbent in the adsorber increases. In a case where the state in the container of the adsorber changes to a state with a different relative vapor pressure, the difference in moisture adsorption amount between two points on the isothermal line becomes equal to an amount of moisture released from or adsorbed by the adsorbent.

Therefore, when the temperature of the condenser 110 or the evaporator 140 is fixed, the adsorption amount of the adsorbent having the properties denoted by the isothermal line A approaches zero as the temperature thereof increases. As the temperature of the adsorbent decreases, the adsorption amount thereof increases and becomes saturated at about 40° C.

Furthermore, when the temperature of the condenser 110 or the evaporator 140 is fixed, the adsorption amount of the adsorbent having the properties denoted by the isothermal line B becomes substantially zero at about 50° C. When the temperature of the adsorbent decreases, the adsorption amount thereof increases and becomes saturated at about 38° C.

In this case, the temperature of the hot discharge water varies between the port (e.g. the port 103) into which the hot discharge water flows and the port (e.g. the port 104) from which the hot discharge water flows.

Assuming that the adsorbents contained in the adsorbers are of either one of the kind of adsorbent having the properties denoted by the solid curve line A or the kind of adsorbent having the properties denoted by the solid curve line B, the amount of moisture released from or adsorbed by the adsorbent at the outflow side of the hot discharge water decreases relatively to that of the adsorbent located near the port into which the hot discharge water flows.

It is assumed that all of the adsorbents used are of the same kind of adsorbent denoted by the solid curve line A and the state of the adsorbent at the inflow side of the hot discharge water corresponds to (55-30) depicted in FIG. 5 and the state of the adsorbent at the outflow side of the hot discharge water corresponds to (55-30) depicted in FIG. 5 during period A discussed in FIG. 2. Assuming that the state of the adsorbent at the inflow side of the cooling water corresponds to (25-18) depicted in FIG. 5 and the state of the adsorbent at the outflow side of the cooling water corresponds to (30-18) depicted in FIG. 5 during period B discussed in FIG. 2, a difference between the amounts of moisture released from or adsorbed by the adsorbents is equal to D1 in the following expression.

$$D1 = Dqa + Dqb$$

In the above expression, Dqa denotes a difference between the amounts of moisture released from or adsorbed by the adsorbents denoted by the solid curve line A in the case where the state (55-30) and the state (30-18) of the adsorbents are alternately repeated. Furthermore, Dqb denotes a difference between the amounts of moisture released from or adsorbed by the adsorbents denoted by the solid curve line A in the case where the state (50-30) and the state (25-18) of the adsorbents are alternately repeated.

On the other hand, assuming that the adsorbents used are of the kind of adsorbent denoted by the solid curve line A and the kind of adsorbent denoted by the solid curve line B and that the state of the adsorbents according to the hot discharge water and the state of the adsorbents according to the cooling water are the same as those described above, a difference between the amounts of moisture released from or adsorbed by the adsorbents is equal to D2 in the following expression.

$$D2 = Dqa + Dqc$$

In the above expression, Dqc denotes a difference between the amounts of moisture released from or adsorbed by the adsorbent denoted by the solid curve line B in the case where the state (50-30) and the state (25-18) of the adsorbents are alternately repeated.

In a case where the state of an adsorbent changes in a low temperature region (i.e., a high relative vapor pressure range), the amount of moisture released from or adsorbed by the adsorbent denoted by the solid curve line B is larger than the amount of moisture released from or adsorbed by the adsorbent denoted by the solid curve line A. This is because the amount of moisture that can be adsorbed by the adsorbent denoted by the solid curve line A does not significantly change in a low temperature region (i.e., a high relative vapor pressure range).

Accordingly, each of the adsorber A1 (130) and the adsorber A2 (120) includes an adsorber containing the adsorbent denoted by the solid curve line A and an adsorber containing the adsorbent denoted by the solid curve line B. Thus, when the hot discharge water flows in, the amount of moisture that is to become water vapor in each of the adsorber A1 (130) and the adsorber A2 (120) is larger than the amount of moisture that is to become water vapor in an adsorber that only contains the adsorbent denoted by the solid curve line A.

Accordingly, the coolant desorption efficiency in each of the adsorber A1 (130) and the adsorber A2 (120) is improved, as compared with an adsorber that only contains the adsorbent denoted by the solid curve line A.

Furthermore, since the hot discharge water surrenders heat of vaporization, the temperature of the hot discharge water flowing out from the adsorber A1 (130) and the adsorber A2 (120) decreases.

Moreover, when the cooling water flows in, the amount of moisture adsorbed in each of the adsorber A1 (130) and the absorber A2 (120) is larger than the amount of moisture adsorbed in an adsorber that only contains the adsorbent denoted by the solid curve line A. Therefore, since adsorption heat is transferred to the cooling water, the temperature of the cooling water flowing out from adsorber A1 (130) and the adsorber A2 (120) further increases. Furthermore, when the adsorber A1 (130) or the adsorber A2 (120) is connected to the evaporator 140, the amount of moisture to be adsorbed in the adsorber A1 (130) or the adsorber A2 (120) becomes larger, so that the amount of moisture that is to become water vapor in the evaporator 140 increases. As a result, the cold water passing through the evaporator 140 is further cooled, so that the cold water that is further reduced in temperature flows out from the evaporator 140.

FIG. 6 is a table illustrating comparison results between a specific example of the adsorption heat pump 100 according to the first embodiment and a comparative example, the results corresponding to temperature changes in the cooling water and the hot discharge water passing through the adsorbers.

In the specific example of the adsorption heat pump 100, commercially-available heat exchangers are used as the adsorbers A1A (130*a*) and the adsorber A2A (120*a*). In each of these heat exchangers, silica gel (e.g. RD2060 manufactured by Fuji Silysia Chemical Ltd.) is used as an adsorbent. Furthermore, commercially-available heat exchangers are used as the adsorber A1B (130*b*) and the adsorber A2B (120*b*). In each of these heat exchangers, spherical activated carbon (e.g. Kureha A-BAC_mp) is used as an adsorbent. On the other hand, in the comparative example, silica gel (e.g. RD2060 manufactured by Fuji Silysia Chemical Ltd.) is used as an adsorbent in each of two commercially-available heat exchangers.

In the adsorption heat pump 100 according to the first embodiment, the temperature of cold water is 18° C., the temperature of cooling water is 25° C., and the temperature of hot discharge water is 55° C. The temperature of cold water flowing out from the evaporator 140 is 12° C. The temperature of outflowing hot discharge water is 48° C., and the temperature of outflowing cooling water is 30° C.

In the comparative example, the temperature of cold water is 18° C., the temperature of cooling water is 25° C., and the temperature of hot discharge water is 55° C. The temperature of cold water flowing out from the evaporator 140 is 15° C. The temperature of outflowing hot discharge water is 51° C., and the temperature of outflowing cooling water is 28° C.

Accordingly, it is obvious that the performance of the adsorption heat pump 100 according to the first embodiment that is equipped with the adsorber A1 (130) and the adsorber A2 (120) is advantageously improved.

Second Embodiment

Figure 7A:
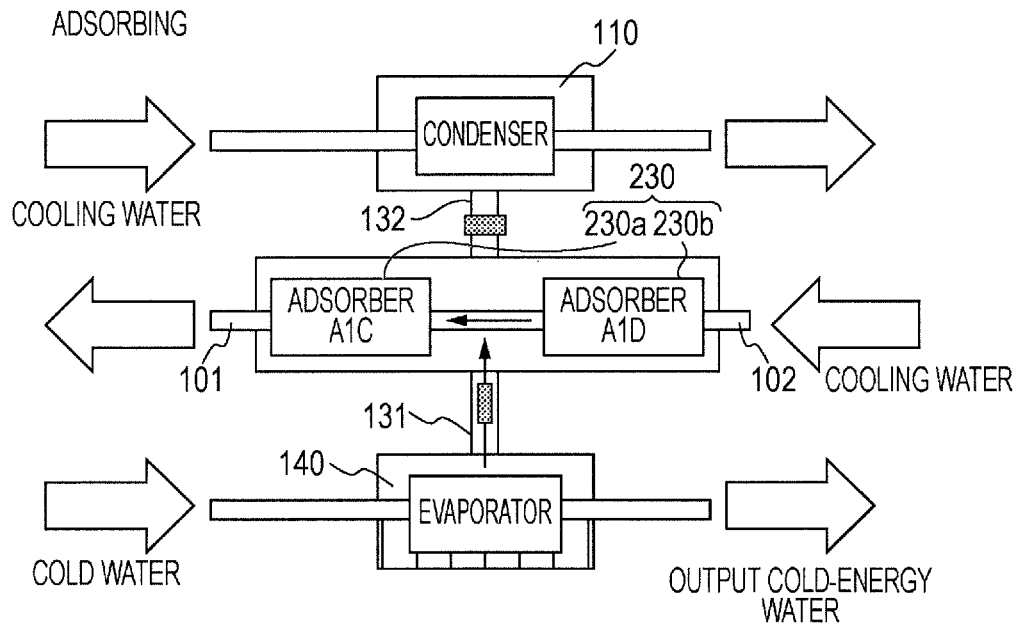
FIG. 7A and FIG. 7B illustrate a first adsorber and a second adsorber in an adsorption heat pump according to a second embodiment.
Figure 7B:
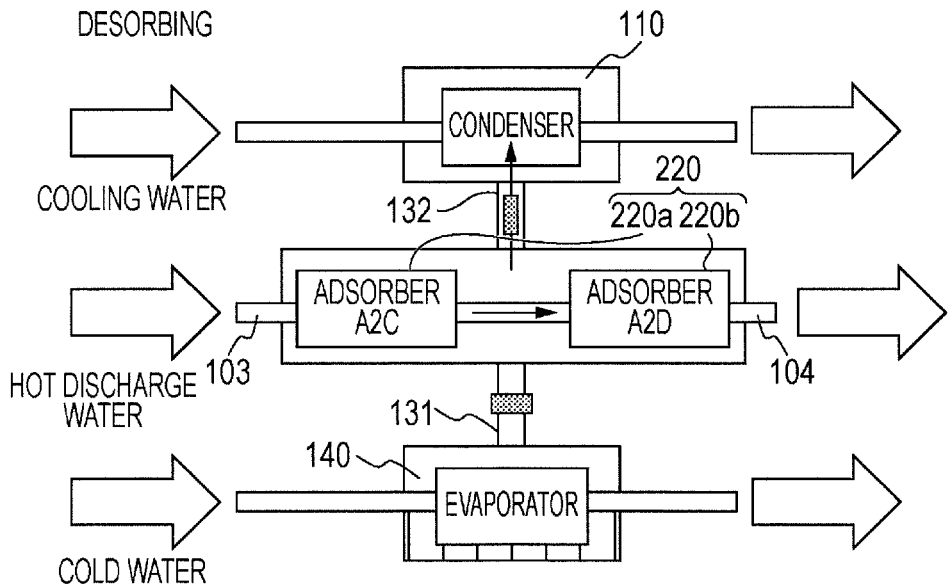

FIG. 7A and FIG. 7B illustrate adsorbers 230 and 220 in an adsorption heat pump according to a second embodiment. In FIG. 7A, the condenser 110, the coolant circulation pipes 131 and 132, the evaporator 140, and the ports 101 and 102 are depicted. Since the condenser 110, the evaporator 140, and the ports 101 and 102 have functions that are the same as those described with reference to FIG. 2, descriptions thereof will be omitted. Since the coolant circulation pipe 131 and the coolant circulation pipe 132 have functions that are the same as those described with reference to FIG. 3A and FIG. 3B, descriptions thereof will be omitted.

In FIG. 7A, the adsorber A1 (230) includes a sealed container that is sealed by closing on-off valves, a pipe extending through the container and allows the cooling water or the hot discharge water to flow therethrough, and an adsorbing section A1C (230*a*) and an adsorbing section A1D (230*b*) that adsorb or desorb a coolant within the container.

Each of the adsorbing section A1C (230*a*) and the adsorbing section A1D (230*b*) contains an adsorbent that is thermally in contact with a pipe and that adsorbs or desorbs the coolant within the container. The aforementioned pipes constitute one continuous pipe having the port 101 and the port 102. The adsorbing section A1C (230*a*) is disposed at the port 101 side of the pipe, whereas the adsorbing section A1D (230*b*) is disposed at the port 102 side of the pipe. The adsorbing section A1C (230*a*) and the adsorbing section A1D (230*b*) are arranged in series.

The adsorbent contained in the adsorbing section A1C (230*a*) has properties corresponding to the adsorbent denoted by the isothermal line A in FIG. 5, and the adsorbent contained in the adsorbing section A1D (230*b*) has properties corresponding to the adsorbent denoted by the isothermal line B in FIG. 5.

When the adsorber A1 (230) in FIG. 7A and the adsorber A1 (130) in FIG. 3A are compared, the two adsorbers differ from each other in having a single sealed container or separated containers for different kinds of adsorbents. However, the adsorber A1 (230) in FIG. 7A and the adsorber A1 (130) in FIG. 3A are similar to each other in that they both have a section that is to become the state (30-18) and a section that is to become the state (25-18), depicted in FIG. 5, during period A discussed in FIG. 2 and a section that is to become the state (55-30) and a section that is to become the state (50-30) during period B.

In FIG. 7B, the adsorber A2 (220) includes a sealed container that is sealed by closing on-off valves, a pipe extending through the container and allows the cooling water or the hot discharge water to flow therethrough, and an adsorbing section A2C (220a) and an adsorbing section A2D (220b) that adsorb or desorb a coolant within the container.

Each of the adsorbing section A2C (220a) and the adsorbing section A2D (220b) contains an adsorbent that is thermally in contact with a pipe and that adsorbs or desorbs the coolant within the container. The aforementioned pipes constitute one continuous pipe having the port 103 and the port 104. The adsorbing section A2C (220a) is disposed at the port 103 side of the pipe, whereas the adsorbing section A2D (220b) is disposed at the port 104 side of the pipe. The adsorbing section A2C (220a) and the adsorbing section A2D (220b) are arranged in series.

The adsorbent contained in the adsorbing section A2C (220a) has properties corresponding to the adsorbent denoted by the isothermal line A in FIG. 5, and the adsorbent contained in the adsorbing section A2D (220b) has properties corresponding to the adsorbent denoted by the isothermal line B in FIG. 5.

When the adsorber A2 (220) in FIG. 7B and the adsorber A2 (120) in FIG. 3B are compared, the two adsorbers differ from each other in having a single sealed container or separated containers for different kinds of adsorbents. However, the adsorber A2 (220) in FIG. 7B and the adsorber A2 (120) in FIG. 3B are similar to each other in that they both have a section that is to become the state (55-30) and a section that is to become the state (50-30), depicted in FIG. 5, during period A discussed in FIG. 2 and a section that is to become the state (30-18) and a section that is to become the state (25-18) during period B.

An adsorption heat pump according to a second embodiment has components similar to those in the adsorption heat pump according to the first embodiment except for an adsorber A1 (230) and the adsorber A2 (220).

Accordingly, the coolant desorption efficiency in each of the adsorber A1 (230) and the adsorber A2 (220) is improved, as compared with an adsorber that only contains the adsorbent denoted by a solid curve line A. As a result, the performance of the adsorption heat pump according to the second embodiment that is equipped with the adsorber A1 (230) and the adsorber A2 (220) is advantageously improved.

Third Embodiment

Figure 8:
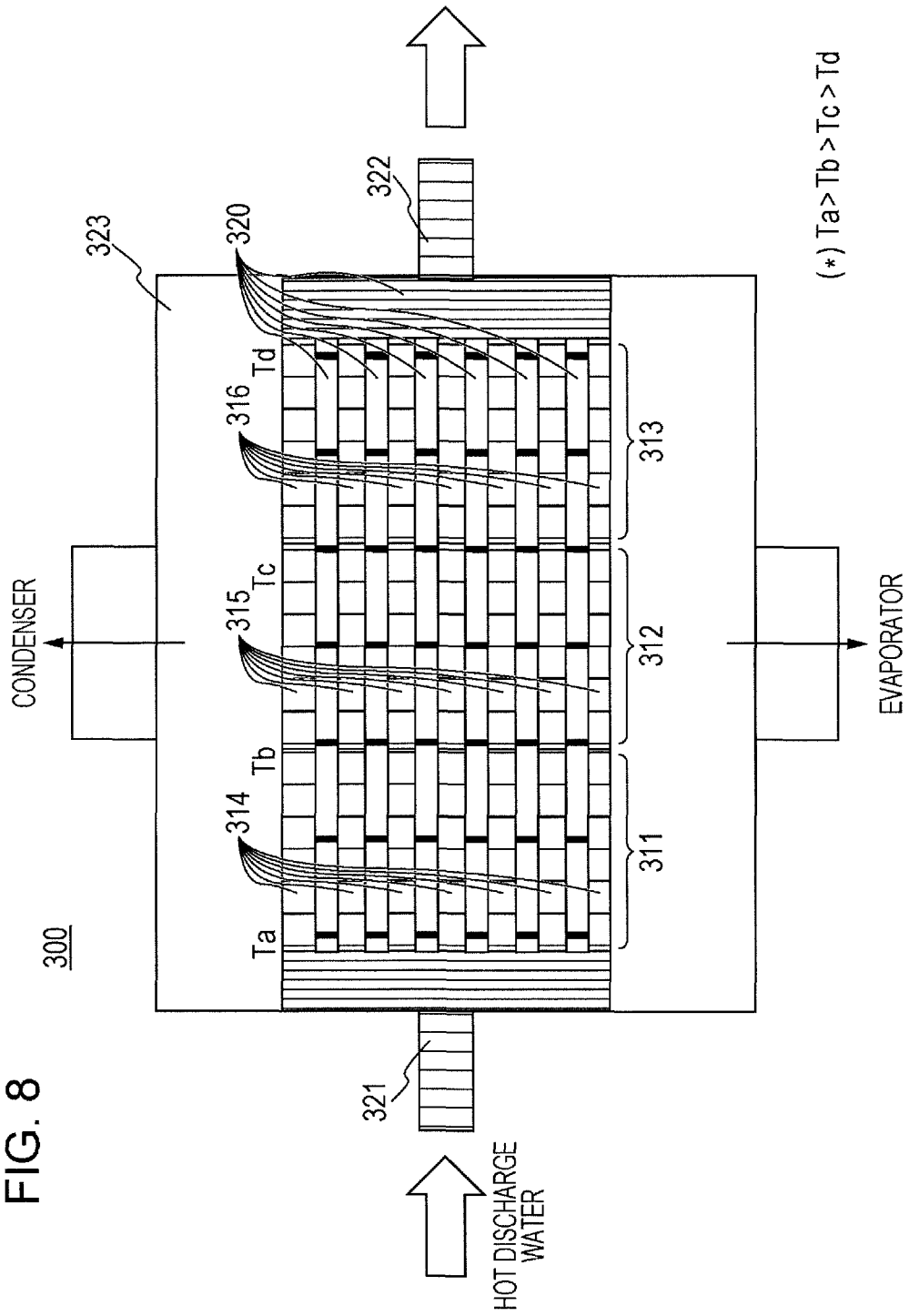
FIG. 8 illustrates an adsorber used in an adsorption heat pump according to a third embodiment.

FIG. 8 illustrates an adsorber 300 used in an adsorption heat pump according to a third embodiment. The adsorber 300 includes an adsorbing section 311, an adsorbing section 312, an adsorbing section 313, an adsorbent 314, an adsorbent 315, an adsorbent 316, a through-pipe 320, a port pipe 321, a port pipe 322, and a container 323.

A pipe that connects to a condenser and a pipe that connects to an evaporator are attached to the container 323. The pipe that connects to the condenser and the pipe that connects to the evaporator each have a valve disposed therein. By opening and closing the valves, the container 323 and the condenser are combined or the container 323 and the evaporator are combined, thereby forming a closed space. The container 323 contains the adsorbing section 311, the adsorbing section 312, and the adsorbing section 313.

The adsorbent 314 that is filled between multiple pipes constituting the through-pipe 320 and that is thermally in contact with the through-pipe 320 is disposed in the adsorbing section 311.

The absorbent 315 that is filled between the multiple pipes constituting the through-pipe 320 and that is thermally in contact with the through-pipe 320 is disposed in the adsorbing section 312.

The adsorbent 316 that is filled between the multiple pipes constituting the through-pipe 320 and that is thermally in contact with the through-pipe 320 is disposed in the adsorbing section 313.

In other words, the adsorbent 314, the adsorbent 315, and the adsorbent 316 are arranged in series along the through-pipe 320. Furthermore, the adsorbing section 311, the adsorbing section 312, and the adsorbing section 313 are also arranged in series along the through-pipe 320.

When the adsorbent 314, the adsorbent 315, and the adsorbent 316 are compared with respect to relative vapor pressure ranges in which the adsorption amounts thereof change, the relative vapor pressure ranges become higher in the following order: the adsorbent 314, the adsorbent 315, and the adsorbent 316.

The through-pipe 320 is formed of a plurality of parallel-arranged pipes and parts where the ends of the pipes are joined. The ends of the through-pipe 320 are connected to the port pipe 321 and the port pipe 322. With regard to the hot discharge water or the cooling water flowing through the through-pipe 320, the flowing directions of the hot discharge water and the cooling water are set such that the temperature of the water flowing at the port pipe 321 side is higher.

For example, the hot discharge water is made to flow from the port pipe 321 toward the port pipe 322. As a result, the temperature of the hot discharge water is high near the port pipe 321, but the temperature of the hot discharge water decreases near the port pipe 322. This is because the hot discharge water flowing through the through-pipe 320 surrenders heat, as heat of vaporization, when the moisture contained in the adsorbent 314, the adsorbent 315, and the adsorbent 316 becomes desorbed therefrom.

On the other hand, for example, the cooling water is made to flow from the port pipe 322 toward the port pipe 321. As a result, the temperature of the cooling water is low near the port pipe 322 but becomes high near the port pipe 321. This is because heat generated when moisture is adsorbed by the adsorbent 314, the adsorbent 315, and the adsorbent 316 is absorbed by the cooling water flowing through the through-pipe 320.

The adsorption heat pump according to the third embodiment is similar to the adsorption heat pump 100 according to the first embodiment in terms of elements excluding the adsorber A1 (130) and the adsorber A2 (120). The adsorption heat pump according to the third embodiment includes the adsorber 300 in place of the adsorber A1 (130) and the adsorber A2 (120).

As described above with reference to FIG. 3A and FIG. 3B, in the case where an adsorbent whose adsorption amount changes within a low relative vapor pressure range and an adsorbent whose adsorption amount changes within a high relative vapor pressure range are arranged in series from an inlet toward an outlet of a pipe, through which the hot discharge water or the cooling water flows, in an adsorber, the coolant desorption efficiency within the adsorber can be maintained at a high level even if the temperature of the hot discharge water decreases or the temperature of the cooling water increases within the adsorber.

In the adsorption heat pump according to the third embodiment, the adsorber 300 contains three kinds of adsorbents, that is, the adsorbent 314, the adsorbent 315, and the adsorbent 316. With regard to the relative vapor pressure ranges in which the adsorption amounts of these adsorbents change, the relative vapor pressure ranges become higher in the following order: the adsorbent 314, the adsorbent 315, the adsorbent 316.

Accordingly, from the standpoint of the relative vapor pressure ranges in which the adsorption amounts change, the coolant desorption efficiency of the adsorber 300 is improved, as compared with an adsorber that only contains one kind of adsorbent. As a result, the performance of the adsorption heat pump according to the third embodiment equipped with the adsorber 300 is advantageously improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An adsorber comprising:
a first adsorbent that performs adsorption or desorption of a coolant;
a second adsorbent whose coolant condition for performing the adsorption or the desorption of the coolant is different from a coolant condition of the first adsorbent;
a container that contains the first adsorbent and the second adsorbent; and
a channel pipe that extends through the container and is thermally in contact with first adsorbent and the second adsorbent,
wherein the first adsorbent and the second adsorbent are disposed at different positions along the channel pipe,
wherein the container contains the first adsorbent and the second adsorbent that are arranged in series between an inlet and an outlet of the channel pipe.

2. The adsorber according to claim 1,
wherein the coolant condition corresponds to a range, in which a coolant adsorption amount changes, defined by a relative vapor pressure corresponding to a lower limit value for the coolant adsorption amount and a relative vapor pressure corresponding to an upper limit value for the coolant adsorption amount.

3. The adsorber according to claim 2,
wherein the range for the first adsorbent is different from the range for the second adsorbent.

4. An adsorber comprising,
a first adsorbent that performs adsorption or desorption of a coolant;
a second adsorbent whose coolant condition for performing the adsorption or the desorption of the coolant is different from a coolant condition of the first absorbent;
a first container that contains the first absorbent;
a second container that contains the second absorbent;
a channel pipe that extends through the first container and the second container and is thermally in contact with both the first absorbent and the second absorbent;
a first coolant circulation pipe that is connected to a condenser and the first container, and a first valve that opens and closes the first coolant circulation pipe;
a second coolant circulation pipe that is connected to an evaporator and the first container, and a second valve that opens and closes the second coolant circulation pipe;
a third coolant circulation pipe that is connected to the condenser and the second container, and a third valve that opens and closes the third coolant circulation pipe; and
a fourth coolant circulation pipe that is connected to the evaporator and the second container, and a fourth valve that opens and closes the fourth coolant circulation pipe,
wherein the first container and the second container are disposed at different positions along the channel pipe,
wherein the first container and the second container are arranged in series between an inlet and an outlet of the channel pipe,
wherein the first adsorber's coolant adsorption amount changes within a first range defined by the coolant condition of the first adsorber, and
wherein the second adsorber's coolant adsorption amount changes within a second range that is different from the first range, the second range being defined by the coolant condition of the second adsorber.

5. The adsorber according to claim 4,
wherein the first range is defined by a relative vapor pressure corresponding to a lower limit value for the coolant adsorption amount of the first absorber and a relative vapor pressure corresponding to an upper limit value for the coolant adsorption amount of the first absorber, and the second range is defined by a relative vapor pressure corresponding to a lower limit value for the coolant adsorption amount of the second absorber and a relative vapor pressure corresponding to an upper limit value for the coolant adsorption amount of the second absorber.

6. An adsorption heat pump comprising:
first adsorbers each that performs adsorption or desorption of a coolant;
second adsorbers each having a second coolant condition for performing the adsorption or the desorption of the coolant which is different from a first coolant condition of the respective first absorbents;
first containers that contain the respective first absorbents;
second containers that contain the respective second absorbents;
channel pipes that extend through the respective first containers and the respective second containers and are thermally in contact with both of the first respective absorbents and the respective second absorbents;
a condenser; and
an evaporator,
wherein the respective first containers and the respective second containers are arranged in series from an inlet toward an outlet of the respective channel pipes.

7. The adsorption heat pump according to claim 6, further comprising:
a valve controller that controls a first valve, a second valve, a third valve, and a fourth valve such that a first coolant circulation pipe is opened and a second coolant circulation pipe is closed during a first period, the first coolant circulation pipe is closed and the second coolant circulation pipe is opened during a second period, a third coolant circulation pipe is closed and a fourth coolant circulation pipe is opened during the first period, and the third coolant circulation pipe is opened and the fourth coolant circulation pipe is closed during the second period.

8. The adsorption heat pump according to claim 6, further comprising:
a hot-water-and-cooling-water supplying section, wherein in a case where a first period in which hot water is supplied to the first adsorber and cooling water whose temperature is lower than a temperature of the hot water is supplied to the second adsorber and a second period in which the cooling water is supplied to the first adsorber and the hot water is supplied to the second adsorber are set, the hot-water-and-cooling-water supplying section causes the hot water to flow from an outlet toward an inlet of a first channel pipe and the cooling water to flow from an inlet toward an outlet of a second channel pipe during the first period, and causes the hot water to flow from the outlet toward the inlet of the second channel pipe and the cooling water to flow from the inlet toward the outlet of the first channel pipe during the second period.

\* \* \* \* \*